United States Patent [19]

Dickey et al.

[11] 4,018,629
[45] Apr. 19, 1977

[54] APPARATUS AND METHOD FOR GUIDING A CUTTING TORCH

[75] Inventors: Buel Earl Dickey, Memphis, Tenn.; David Earl Johnson, Nesbit, Miss.

[73] Assignee: Alco-Gravure, Inc., New York, N.Y.

[22] Filed: Jan. 9, 1976

[21] Appl. No.: 647,885

[52] U.S. Cl. .............................. 148/9 R; 266/51; 266/54
[51] Int. Cl.² ........................................ B23K 7/04
[58] Field of Search ............ 148/9 R, 9.5, 9.6; 266/51, 54

[56] References Cited
UNITED STATES PATENTS

| | | | |
|---|---|---|---|
| 3,662,999 | 5/1972 | Meyer | 148/9.6 |
| 3,940,292 | 2/1976 | Bode, Jr. et al. | 148/9.5 |

FOREIGN PATENTS OR APPLICATIONS

| | | | |
|---|---|---|---|
| 940,961 | 11/1963 | United Kingdom | 148/9.6 |

*Primary Examiner*—W. Stallard
*Attorney, Agent, or Firm*—Kenyon & Kenyon Reilly Carr & Chapin

[57] ABSTRACT

Apparatus is disclosed for guiding a metal cutting torch to enable the flame thereof to cut a controlled thickness of metal material from the length of the outer surface of a elongated hollow cylindrical workpiece mounted securely to a shaft extending therethrough to enable the wall of the workpiece to be severed. A carriage for holding the cutting torch is slidably supported for movement along the length of the workpiece when the apparatus is mounted on the workpiece. The apparatus includes a feeding device for advancing the cutting torch at a controlled rate to enable the cutting torch to cut away substantially all of the thickness of a length of the workpiece, thereby weakening the workpiece sufficiently to enable its wall to be severed.

13 Claims, 8 Drawing Figures

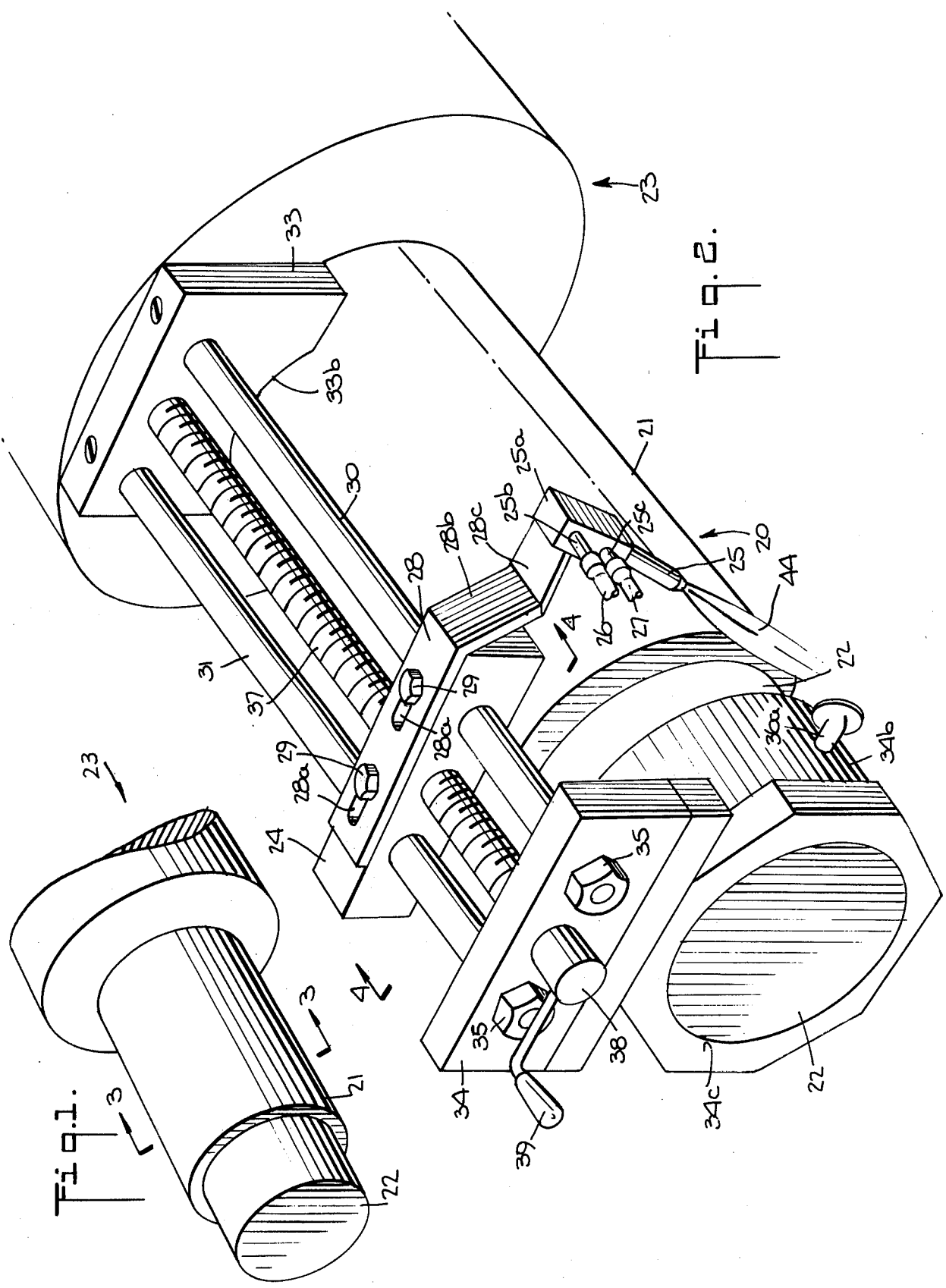

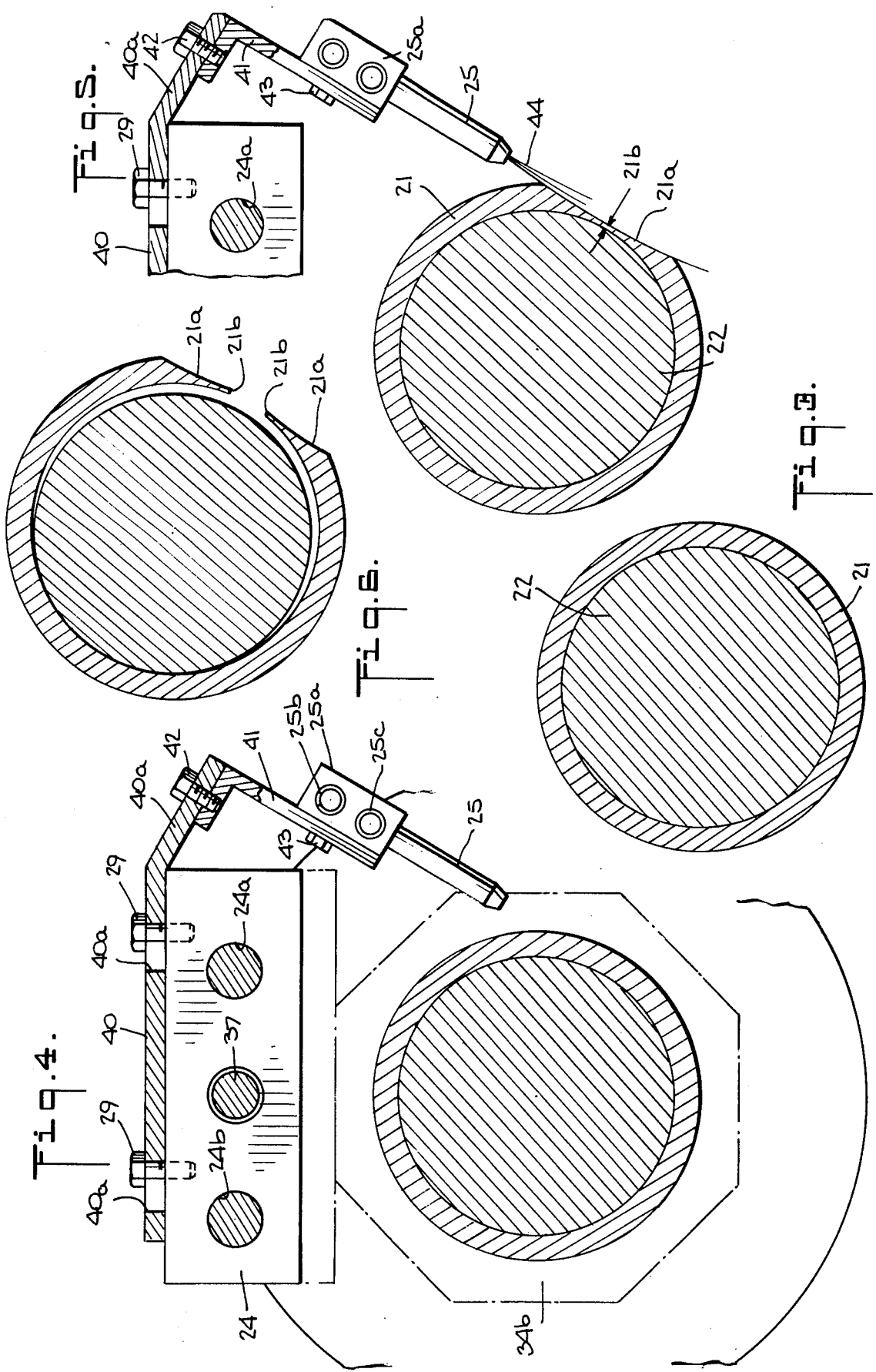

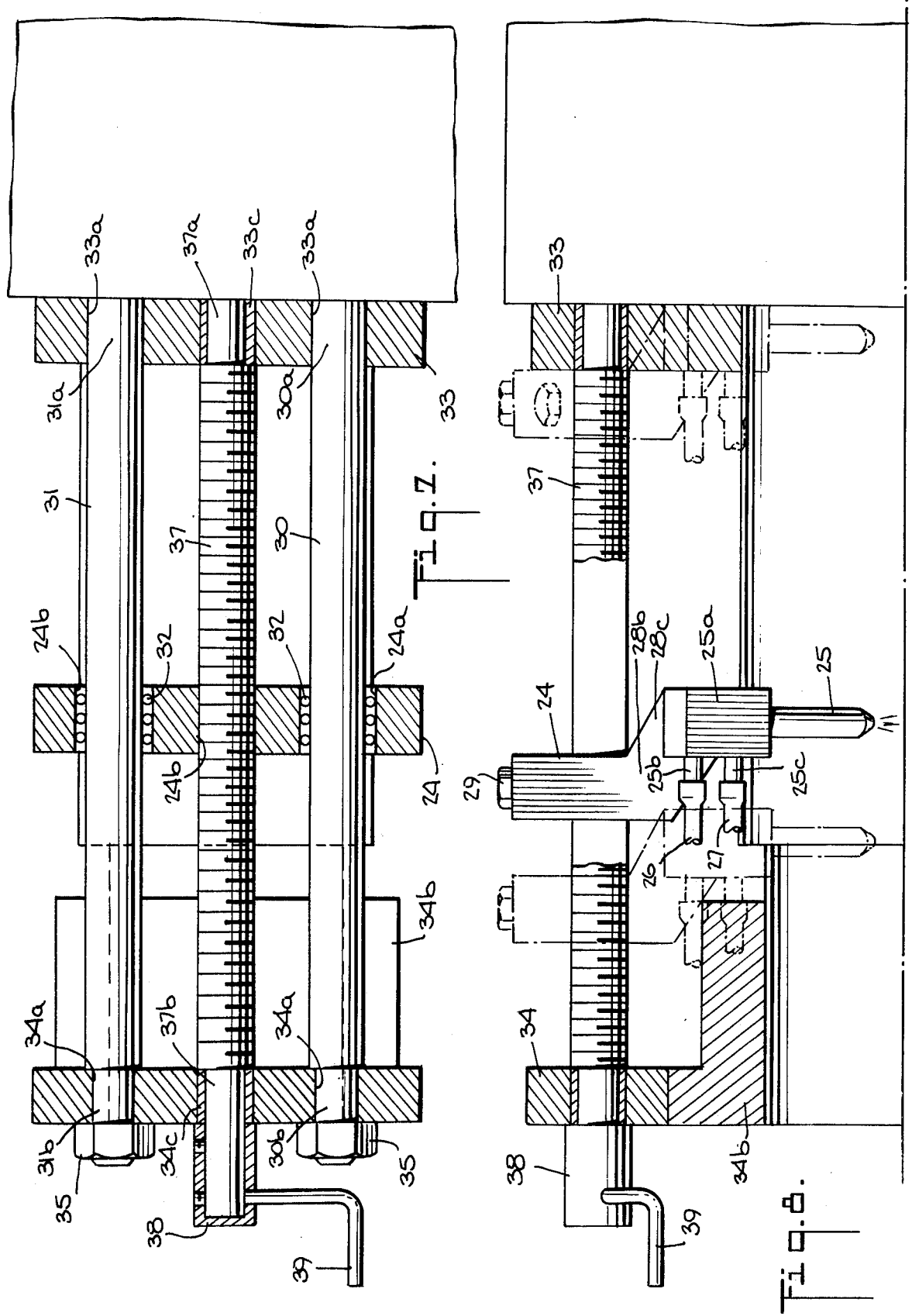

APPARATUS AND METHOD FOR GUIDING A CUTTING TORCH

BACKGROUND OF THE INVENTION

1. Field of the Invention

The invention relates to the field of controlling of the length and depth of a metal cutting operation being carried out by a cutting torch. In addition, the invention relates to the field of guiding a cutting torch to cut an accurately controlled thickness of metal from the surface of a hollow workpiece in connection with the removal of the workpiece from another structure extending therethrough.

2. Description of the Prior Art

U.S. Pat. No. 2,432,240, which issued on Dec. 9, 1947, discloses a portable apparatus for controlling a cutting torch to cut a metal beam. The apparatus of this patent is constructed to make a cut extending at right angles to the surface of the beam in order to cut completely through the beam.

U.S. Pat. No. 2,061,442, which issued on Nov. 17, 1936, and U.S. Pat. No. 2,594,151, which issued on Apr. 22, 1952, show devices adapted to be clamped to cylindrical workpieces such as pipes. These devices cut at substantially a right angle to the surface of the pipe and cut completely through the pipe about its periphery.

U.S. Pat. No. 2,152,213, which issued on Mar. 28, 1939, discloses a device for controlling a torch to cut away an outer portion of a plate to which the apparatus is attached. The device includes the construction for advancing the torch along the length of the plate.

U.S. Pat. No. 2,125,178, which issued on July 26, 1938, discloses an apparatus upon which a solid cylindrical workpiece such as a billet is mounted. The apparatus is adapted to condition the surface of the billet by a torch as the billet is rotated with respect to the torch.

SUMMARY OF THE INVENTION

The invention comprises an apparatus and method for guiding a cutting torch to enable the flame of the cutting torch to cut a controlled thickness of metal from the outer wall of a hollow enlongated cylindrical workpiece disposed upon a shaft. By way of example, the invention can be employed to remove a bearing sleeve from the roll shaft of a printing cylinder of a printing press. The invention includes a mounting construction adapted to be engaged with the outer surface of the workpiece upon which a cut is to be made and also in engagement with the shaft. A slidably supported carriage is located on the mounting construction engaged to the workpiece. The carriage holds a cutting torch at a predetermined position thereon by means of which the flame of the cutting torch can be directed toward the surface of the workpiece at a shallow angle thereto. Further in accordance with the invention, there is provided a construction for advancing the carriage along its support at a controlled rate to enable the cutting torch to cut away a major portion of the thickness of the workpiece along its length. After using the apparatus of the invention, the wall of the workpiece is sufficiently reduced in thickness by the cutting operation to cause the wall to be weakened. As a result, the wall can be fractured along the reduced thickness by the application of force to the workpiece with the result that the workpiece can be separated from a supporting structure upon which it may be disposed.

In the application of the invention to a printing cylinder, the invention enables a bearing sleeve to be removed from the printing cylinder. Thus, in this field of use of the invention, bearing sleeves which are heat-shrunk onto roll shafts at the opposite ends of a printing cylinder can be simply and conveniently removed without damaging the roll shafts upon which they are disposed. The bearing sleeves of a printing cylinder experience wear during prolonged press runs and as a result must be periodically replaced. Heretofore such bearing sleeves have been removed by weakening the wall of the bearing sleeve by reducing its thickness by use of a grinding tool or a metal cutting tool. Since the bearing sleeve is formed as hardened material, it is inherently a difficult material to grind away or to cut away by a metal cutting tool. Furthermore, it is not possible to apply heat to the bearing sleeve to expand the sleeve and thereby free it from the roll shaft since the application of heat, typically by a torch, to the outer surface of a bearing sleeve would cause damage to the printing cylinder.

BRIEF DESCRIPTION OF THE DRAWINGS

FIG. 1 is a fragmentary perspective view of a cylinder showing a bearing sleeve shrunk upon the roll shaft of a printing cylinder;

FIG. 2 is a fragmentary perspective view of the apparatus of the invention mounted upon a bearing sleeve and roll shaft of a printing cylinder and showing a cutting operation in progress;

FIG. 3 is a vertical section view taken along the line 3—3 in FIG. 1 and showing a bearing sleeve shrunk upon a roll shaft;

FIG. 4 is a fragmentary vertical section view taken along the line 4—4 in FIG. 2 and showing a cutting torch held by the apparatus of the invention with the apparatus mounted upon a bearing sleeve and roll shaft;

FIG. 5 is a fragmentary vertical section view showing a cutting torch mounted upon the apparatus of the invention and removing a controlled thickness of metal from a bearing sleeve;

FIG. 6 is a vertical section view showing a bearing sleeve which has been cut by the apparatus of the invention and being severed along its wall for removal from a roll shaft;

FIG. 7 is a horizontal section view showing the means for slidably supporting the carriage for holding the cutting torch and the means for advancing the carriage; and FIG. 8 is a vertical section view showing the cutting torch in a series of positions along the length of the bearing sleeve as the cutting torch is advanced by the apparatus of the invention.

DESCRIPTION OF THE PREFERRED EMBODIMENT

Apparatus 20 of the invention as shown in FIG. 2 is utilized to remove bearing sleeve 21 from roll shaft 22 of printing cylinder 23. The printing cylinder 23 (FIG. 1) can be of the typed used in the type of gravure printing generally referred to as rotogravure. The printing element of the printing cylinder can be a thin copper plate wrapped around the cylinder or copper electroplated thereon. The copper plate is etched in acordance with the image which is to be printed. Thus the thin copper plate is etched to different depths depending upon the varying depths of hardening of gelatin resist in accordance with the variations in tone of the original. The areas corresponding to the lines of the gravure screen used in preparing the gelatin resist remain unetched and provide lands to support a doctor blade of the printing press during printing. For long printing runs the etched cylinder may be chromium-plated to resist wear.

Rotogravure is widely used for newpaper magazine supplements, magazines, mail-order catalogs, cartons and labels and in the printing of cellophane, plastic films, foils and plastic laminates. Complex 10- and 12-unit multicolor rotogravure presses with automatic paper reels are used to print magazines and catalogs at speeds up to 25,000 revolutions per hour. The process is practical on large volume runs, such for example, 100,000 or more impressions. It is not uncommon to have runs of 1,000,000 copies by the rotogravure process.

As a consequence of the long production runs and the high operating speeds which are achieved in the rotogravure process, the bearing sleeve of the printing cylinder, notwithstanding that it is formed of hardened material, experiences wear and must be periodically replaced. The bearing sleeve 21 is typically secured by a shrink-fit on the outer surface of the roll shaft 22 extending outwardly from the opposite ends of printing cylinder 23. Thus a bearing sleeve which is machined to fit closely with respect to the outer surface of the roll shaft is installed by expanding the bearing sleeve by heating and pressing it upon the roll shaft while the bearing sleeve remains at an elevated temperature. Customarily members which are shrunk upon a shaft are subsequently disassembled by reversing the installation process. Thus it is conventional to heat a sleeve which has been shrunk onto a shaft and thereby expand the sleeve in order that it can be removed with a reasonable degree of force from the shaft upon which it is mounted.

In the case of a printing cylinder the application of heat to the bearing sleeve could cause damage to the printing cylinder and accordingly is an unacceptable practice. Instead it is customary in the trade to remove a worn bearing sleeve by weakening the wall of the bearing sleeve so that it can be ultimately split from the roll shaft. The wall of the sleeve is weakened by grinding away a major portion of the thickness of the wall of the sleeve along its length or by utilizing metal cutting tools to reduce the wall thickness of the sleeve. Thereafter the application of a reasonable degree of force to the sleeve enables the wall portion of reduced thickness to be split. Experience has shown that to remove a bearing sleeve by the conventional procedures in the trade is time-consuming and is complicated by the lack of portable tools which can effectively carry out a grinding or metal cutting operation. For a typical printing cylinder it is common to spend 4 to 6 hours in removing a sleeve. Furthermore, the use of tools which are not specifically designed for removal of a bearing sleeve from a printing cylinder presents the risk of cutting through the sleeve and permanently damaging the roll shaft beneath.

The portable tool apparatus 20 of the invention comprises carriage 24 for holding a cutting torch 25 which, by way of example, can be an oxy-acetylene torch. The torch includes body portion 25a having fittings 25b and 25c to which are attached bases 26 and 27, respectively, for delivering gases to the torch.

As shown in FIGS. 2 and 8 carriage 24 which can serve as a base portion is provided with an arm member 28 which is adjustably attached to the carriage by means of cap screws 29 extending through slots 28a in the arm member. Arm member 28 is provided with an extension 28b extending outwardly from carriage 24 and at an angle to the length thereto in order to enable the torch 25 to be directed to the outer surface of bearing sleeve 21. The free end of extension 28b opposite the carriage can be provided with portion 28c extending to one of the sides of the carriage in order to offset the torch with respect to the carriage as is discussed subsequently herein.

Means for slidably supporting the carriage for moving along a path of travel of a predetermined length with respect to the bearing sleeve includes guide rods 30 and 31 which extend through bores 24a and 24b, respectively, of carriage 24 as shown in FIG. 7. To enable the carriage to move smoothly and with little friction along the guide rods, the bores of the carriage are fitted with low-friction bushings, such as ball bushing 32. As shown in FIG. 2, guide rods 30 and 31 extend from the oppositely disposed face portions of plate 33 and end plate 34. In FIG. 7, guide rods 30 and 31 are disclosed as having portions 30a and 31a, respectively, disposed in bores 33a in plate 33. The opposite ends of guide rods 30 and 31 include stepped portions 30b and 31b which are mounted in bores 34a of end plate 34. The stepped portions of the guide rods can be threaded and by means of nuts 35, end portions 30b and 31b can be secured to end plate 34.

As shown in FIG. 3, edge portion 33b of plate 33 is contoured to engage an extent of the outer surface of bearing sleeve 21. The contoured edge insures that the plate 33 rests securely upon the bearing sleeve. End plate 34 is provided with flange or sleeve 34b which has an inside surface adapted to fit the outer surface of roll shaft 22. The length of the sleeve in the direction of the axis of the shaft insures that the sleeve and thereby end plate 34 can be securely attached to the roll shaft, thereby enabling the apparatus of the invention to be held tightly in place on the printing cylinder when in use in cutting the bearing sleeve. Sleeve 34b can be provided with a means for mechanically locking the sleeve to the roll shaft such as thumb screw 36 having threaded shank 36a which extends through the wall of the sleeve and is threadedly engaged therewith. Thus tightening of the thumb screw with respect to the roll shaft mechanically locks the sleeve and thereby the apparatus of the invention to the roll shaft and with respect to the bearing sleeve to be cut.

Means for advancing the carriage along the supporting means, that is to say means for advancing carriage 24 along guide rods 30 and 31, includes threaded shaft 37 (FIG. 7) which is threadedly engaged to carriage 24 at threaded opening 24b therein. Ends 37a and 37b of the threaded shaft are stepped and are mounted for rotation within bushings 33c and 34c, respectively. Hub 38 is secured to end portion 37b of threaded shaft 37 and is provided with crank 39 which enables an operator to rotate threaded shaft 37 in either direction. Since the carriage 24b is coupled to threaded shaft 37, rotation of the shaft advances the carriage and thereby the cutting torch held thereon with respect to a workpiece such as a bearing sleeve.

As shown in FIG. 8, torch 25 can be offset by means of end position 28c of extension 28b in a direction projecting toward plate 33. As a result torch 25 can clear plate 33 when the carriage is brought to the extreme end position towards plate 33 as shown in the right-hand side of FIG. 8. Accordingly the complete length of the sleeve can be cut. Base portion 25a of a torch can be adjustably mounted with respect to end portion 28d in order to determine the relative position of the torch with respect to the bearing sleeve.

As shown in FIG. 4, the arm for holding the torch to carriage 24 can comprise arm 40 having slots through which attaching cap screws 29 extend. Extension 40a of the arm engages bracket 41 which is secured to the extension by cap screw 42. Body portion 25a of the torch is secured to bracket 41 by a pivotal mounting such as that provided by cap screw 43 extending through an opening in bracket 41 and threadedly engaged to body portion 25a.

OPERATION

In using the apparatus of the invention, the apparatus, being portable, is transported to the printing cylinder which is to be serviced. Contoured edge 33b of plate 33 is aligned with the outer surface of the bearing sleeve 21 while the opening of sleeve 34b is aligned with the outer surface of roll shaft 22. Thumb screw 36 is turned outwardly with respect to the sleeve. The apparatus can then slip into place with plate 33 abutting the end portion of the printing cylinder and sleeve 34b in place on the roll shaft 22.

With the apparatus mounted upon the bearing sleeve and the roll shaft, torch 25 is mounted with respect to the carriage 24 by either arm member 28 or 40. As shown in FIG. 5, torch 25 is adjusted with respect to sleeve 21 to cause flame 44 to extend in a substantially tangential relationship with respect to the outer surface of the bearing sleeve. As a result cut 21a is formed across the surface of the bearing sleeve. The size of the flame and the position of the nozzle are adjusted to insure that a major portion of the wall thickness of the sleeve is cut away while leaving a thin web 21d in FIGS 5 and 6 in the wall of the sleeve.

By revolving crank 39 and rotating threaded shaft 37, the operator can advance the carriage and thereby the torch along the length of the sleeve. In this way a cut can be made along the entire length of the sleeve while maintaining the minimum wall thickness 21d in the cut area. This provision protects roll shaft 22b from being damaged during the cutting operation. Once the cut has been made along the entire length of the shaft, the torch is extingished and the apparatus is removed from the bearing sleeve and roll shaft. Thereafter, the application of force to the sleeve adjacent to the minimum wall thickness 21d is capable of fracturing or splitting the sleeve as shown in FIG. 6. Once the sleeve is split it can be spread open along the split line and thereafter be freed with respect to the roll shaft. As a final step the split sleeve is moved in the direction of the axis of the roll shaft and away from the printing cylinder in order to separate sleeve from the printing cylinder. By way of example, the minimum wall thickness remaining after a cutting operation in accordance with the invention is approximately 1/32 of an inch. Such a thin web can readily be cracked to enable the bearing sleeve to be removed.

What is claimed is:

1. Apparatus for guiding a cutting torch to enable the flame thereof to cut a controlled thickness of metal material from a length of the outer surface of a hollow elongated cylindrical workpiece with the interior portion thereof disposed upon a shaft extending beyond one end portion of the workpiece to enable the wall of the workpiece to be severed along the cut comprising:
   a. a carriage for holding a cutting torch at a predetermined position with respect thereto;
   b. means for slidably supporting the carriage for movement along a path of travel of predetermined length;
   c. a pair of means for mounting the supporting means adjacent to the workpiece with the path of travel of the carriage being substantially parallel to the longitudinal axis of the workpiece, each mounting means being spaced apart from the other by a distance substantially equal to the predetermined length of the path of the travel of the carriage and adapted to be disposed adjacent to a different opposite end of the workpiece, one of the pair of mounting means being adapted to engage the outer surface of the workpiece, the other of the pair of mounting means being adapted to engage the outer surface of the portion of the shaft extending beyond one end portion of the shaft extending beyond one end portion of the workpiece, the pair of mounting means enabling a cutting torch when supported by the carriage to have its flame directed toward the outer surface of the workpiece; and
   d. means for advancing the carriage along the supporting means at a controlled rate to move the carriage and thereby a cutting torch when attached thereto along the length of and adjacent the outer surface of the workpiece to cut away a major portion of the thickness of the workpiece along its length.

2. Apparatus in accordance with claim 1 and further comprising means for adjustably securing a cutting torch to the carriage in a predetermined position with respect thereto.

3. Apparatus in accordance with claim 1 in which the carriage comprises a base portion engaged with the supporting means for slidable movement thereon and an arm member adjustably attached at one end portion thereof to the base portion for movement in a direction transversely with respect to the path of travel of the carriage, the other end portion of the arm member being adapted to support the cutting torch, the adjustable arm member enabling the relative position to the cutting torch to the outer surface of the workpiece to be selected.

4. Apparatus in accordance with claim 1 in which the carriage extends tranversely with respect to the path of travel thereof, the carriage having an extension projecting outwardly from an end portion thereof and at an angle with respect to the path of travel and in the direction of the one mounting means of the pair which is adapted to engage the outer surface of the workpiece, the free end of the extension opposite the carriage projecting beyond the portion of the one mounting means of the pair adjacent thereto when the carriage is advanced to adjacent the one mounting means to enable the cutting torch held thereon to clear the one mounting means when cutting the end portion adjacent thereto of the workpiece.

5. Apparatus in accordance with claim 1 which the means for slidably supporting the carriage comprises a pair of rods spaced apart and substantially parallel to one another and extending between the pair of mounting means, each of the rods being slidably engaged with the carriage.

6. Apparatus in accordance with claim 1 in which one of the pair of means for mounting the supporting means with respect to the workpiece comprise a plate having a pair of oppositely disposed face portions, one of the face portions being engaged with the supporting means, the plate having an edge portion disposed between the face portions, the edge portion being contoured to engage an extent of the outer surface of the cylindrical workpiece when the supporting means is mounted with respect to the workpiece.

7. Apparatus in accordance with claim 1 in which the other of the pair of means for mounting the supporting means with respect to the workpiece comprises an end plate having a pair of oppositely disposed face portions, the face portion directed toward the other mounting means of the pair being engaged with the supporting means, the end plate having an opening therein disposed to one side of the area in which the face portion is engaged with the supporting means, the opening being adapted to engage the outer surface of the portion of the shaft extending beyond one end portion of the workpiece.

8. Apparatus in accordance with claim 7 in which the inner surface of the opening is adapted to engage the outer surface of the portion of the shaft substantially throughout the length of the inner surface.

9. Apparatus in accordance with claim 7 in which the portion of the end plate having an opening therein adapted to engage the outer surface of the portion of the shaft extending beyond one end portion of the workpiece comprises an elongated sleeve having its longitudinal axis extending substantially parallel to the path of travel of the carriage, the sleeve having an inner surface adjacent the opening thereof adapted to engage a length of the outer surface of the portion of the shaft extending beyond one end portion of the workpiece.

10. Apparatus in accordance with claim 7 and further comprising means mounted upon the end plate and extending the interior of the opening therein for mechanically locking the end plate to the outer surface of the portion of the shaft.

11. Apparatus in accordance with claim 1 in which the means for advancing the carriage along the supporting means at a controlled rate comprises a threaded shaft having the end portions thereof pivotally mounted in the pair of mounting means and threadedly engaged with the carriage and means for rotating the threaded shaft to advance the carriage along the supporting means.

12. Apparatus for guiding a cutting torch to enable the flame thereof to cut a controlled thickness of metal material from a length of the outer surface of a hollow elongated cylindrical bearing sleeve of a printing cylinder with the interior portion of the sleeve disposed upon a roll shaft extending beyond one end portion of the sleeve to enable the wall of the workpiece to be severed along the cut, the printing cylinder having a cylindrical printing surface with a diameter greater than that of the sleeve, the apparatus comprising:
 a. a carriage for holding a cutting torch at a predetermined position with respect thereto;
 b. means for slidably supporting the carriage for movement along a path of travel of predetermined length;
 c. a pair of means for mounting the supporting means adjacent to the sleeve with the path of travel of the carriage being substantially parallel to the longitudinal axis of the sleeve, each mounting means being spaced apart from the other by a distance substantially equal to the predetermined length of the path of travel of the carriage and adapted to be disposed adjacent to a different opposite end of the sleeve, one of the pair of mounting means being adapted to engage the outer surface of the sleeve, the other of the pair of mounting means being adapted to be clamped about the outer surface of the portion of the roll shaft extending beyond one end portion of the sleeve, the pair of mounting means enabling a cutting torch when supported by the carriage to have its flame directed toward the outer surface of the sleeve; and
 d. means for advancing the carriage along the supporting means at a controlled rate to move the carriage and thereby a cutting torch when attached thereto along the length of and adjacent the outer surface of the sleeve to cut away a major portion of the thickness of the sleeve along its length without contacting the roll shaft with the flame of the torch.

13. A method for guiding a cutting torch to enable the flame thereof to cut a controlled thickness of metal material from a length of the outer surface of a hollow elongated cylindrical workpiece with the interior portion thereof disposed upon a shaft extending beyond one end portion of the workpiece to enable the wall of the workpiece to be severed along the cut comprising the steps of:
 a. supporting the torch on the outer surface of the portion of the shaft extending beyond one end portion of the workpiece and on the opposite end portions of the workpiece;
 b. positioning the torch to direct the flame thereof in a substantially tangential relationship to the outer surface of the workpiece to cut a controlled thickness of metal material from the outer surface of the workpiece; and
 c. advancing the torch supported on the shaft of the workpiece while the flame of the torch is in the tangential relationship with the workpiece in a direction extending throughout the length of the workpiece to enable the torch to cut away a major portion of the thickness of the workpiece along its length.

* * * * *

UNITED STATES PATENT AND TRADEMARK OFFICE
CERTIFICATE OF CORRECTION

PATENT NO. : 4,018,629

DATED : April 19, 1977

INVENTOR(S) : Buel Earl Dickey and David Earl Johnson

It is certified that error appears in the above-identified patent and that said Letters Patent are hereby corrected as shown below:

Column 2, line 16, change "as" to --of--.

Column 5, line 43, after "21d" insert --shown--.

Column 6, line 26, delete "of the shaft extending beyond one end portion".

Signed and Sealed this

Eleventh Day of October 1977

[SEAL]

Attest:

RUTH C. MASON
Attesting Officer

LUTRELLE F. PARKER
Acting Commissioner of Patents and Trademarks